United States Patent [19]

Payne et al.

[11] 4,347,167

[45] Aug. 31, 1982

[54] FINE-GRAIN SEMICONDUCTING CERAMIC COMPOSITIONS

[75] Inventors: David A. Payne, Champaign, Ill.; Sang M. Park, Penn Yan, N.Y.

[73] Assignee: University of Illinois Foundation, Urbana, Ill.

[21] Appl. No.: 192,693

[22] Filed: Oct. 1, 1980

[51] Int. Cl.$^3$ .............................................. H01B 1/06
[52] U.S. Cl. .................................. 252/520; 106/73.2; 106/73.3; 106/73.31; 106/73.5; 75/206; 75/226; 361/321; 357/10; 264/61; 501/134; 501/137; 501/138; 501/152; 501/154
[58] Field of Search .............. 252/518, 519, 520, 521, 252/62.3 R, 62.32 B, 62.3 BT, 63.5; 357/7, 10; 106/73.2, 73.3, 73.31, 73.5; 75/200, 206, 214, 226; 361/313, 318, 321, 322; 264/61, 65

[56] References Cited

U.S. PATENT DOCUMENTS

| | | | |
|---|---|---|---|
| 3,997,479 | 12/1976 | Shimoyo et al. | 252/521 |
| 4,101,454 | 7/1978 | Kulwicki et al. | 252/518 |
| 4,143,207 | 3/1979 | Itakiray et al. | 252/520 |

*Primary Examiner*—Joseph L. Schofer
*Assistant Examiner*—J. L. Barr
*Attorney, Agent, or Firm*—Merriam, Marshall & Bicknell

[57] ABSTRACT

A semiconducting internal boundary layer ceramic composition having a fine grain structure suitable for use in thin-layer multilayer capacitors is made in one step by firing a mixture comprising a major amount of finely divided strontium titanate, a minor amount of a compound containing either strontium or titanium, or an element functionally equivalent thereto, a minor amount of a semiconductor forming ingredient (dopant), the identity of which depends on whether the mixture is rich in strontium or in titanium, and a minor amount of a counterdopant selected from cuprous oxide or silver oxide. When the mixture is rich in titanium, the chemical doping agent used to produce semiconductivity is an oxide of a trivalent metal selected from bismuth, boron, iron, antimony, lanthanum and the rare earth and transition metals. When the mixture is rich in strontium, the dopant is an oxide of a pentavalent or hexavalent metal selected from tungsten (+6), niobium (+5), tantalum (+5), and molybdenum (+6).

15 Claims, No Drawings

FINE-GRAIN SEMICONDUCTING CERAMIC COMPOSITIONS

This invention relates to internal insulating boundary layer semiconducting ceramic compositions and to a method for making such compositions. More particularly, the invention relates to fine-grain compositions suitable for use as dielectrics in thin-layer, multilayer capacitors, made by a method in which a single firing step is used to simultaneously render the composition semiconducting and to provide internal insulating boundary layers.

BACKGROUND OF THE INVENTION

Semiconducting ceramic compositions based on polycrystalline strontium titanate having internal insulated grain boundaries are known for use as capacitor dielectric materials. Such ceramic materials, examples of which are described in U.S. Pat. Nos. 3,933,668 and 4,143,207, can have high dielectric constants and desirable temperature and voltage characteristics. In the past, these ceramic materials have typically been made by a process requiring two high-temperature firing steps, viz., a first step to produce a densified semiconducting ceramic composition and a second step to insulate the grain boundaries. While the semiconducting compositions based on strontium titanate heretofore known can have many desirable properties, they also have relatively large grain sizes, generally above 25 microns and typically greater than 50 microns, regardless of the particle size of the titanate powder used in their preparation. Accordingly, while such ceramic compositions are suitable for use as dielectrics in many forms of capacitors, they cannot be used in thin-layer, multilayer capacitors, particularly those in which the dielectric layer desirably has a thickness less than 20 microns.

SUMMARY OF THE INVENTION

In accordance with the present invention, a semiconducting internal boundary layer ceramic composition having a fine grain structure can be made by firing a mixture comprising a major amount of finely divided strontium titanate and a minor amount of a compound containing either strontium or titanium, or an element functionally equivalent thereto, which in effect modifies the ratio of strontium to titanium to produce a strontium-rich or titanium-rich mixture. The mixture to be fired also contains a semiconductor forming ingredient (dopant), the identity of which depends on whether the mixture is rich in strontium or in titanium, and a minor amount of a counterdopant selected from cuprous oxide or silver oxide. The stoichiometry of strontium titanate can be modified to produce an excess of titanium by incorporating in the firing mixture an oxide of titanium, zirconium, germanium, silicon or tin, in which case the dopant is selected from the oxides of bismuth, boron, iron, antimony, lanthanum and the rare earth and transition metals. Alternatively, the strontium titanate can be made rich in strontium by the use of an oxide of strontium, calcium, barium or lead, in which case the dopant is selected from certain oxides of tungsten, niobium, tantalum, and molybdenum.

The mixture containing the above-identified components is prepared and fired at a temperature of about 1200°–1400° for about 10–300 minutes, in air, or a neutral or reducing atmosphere.

In contrast to the methods of the prior art, in which separate firing operations were required to first produce a densified semiconducting strontium titanate ceramic and then to insulate the grain boundaries thereof, in the present invention all of these effects, i.e., semiconductor formation, densification, and insulation of the grain boundaries, are achieved simultaneously, in a manner which is simpler, faster, and more economical in its use of energy. In addition to economy and simplicity, however, the process of the invention has the further advantage that it does not cause any appreciable increase in the grain size of the polycrystalline strontium titanate powder used therein. Accordingly, by employing suitably finely divided strontium titanate, e.g., less than 10 microns, there can be produced ceramic compositions suitable for use as dielectrics in thin-layer, multilayer capacitors in which the limiting factor in the thickness of the dielectric layer is the grain size of the ceramic material.

DETAILED DESCRIPTION

The present invention is based on the use of strontium titanate as the principal material in the ceramic composition. Strontium titanate has a perovskite lattice structure which can be represented by the formula $ABX_3$, wherein A and B are divalent and tetravalent metal cations respectively, and X is a divalent anion, typically oxygen. The results achieved by the present invention depend in part on controlling the ratio of A (strontium) to B (titanate) components in the lattice structure of the strontium titanate which is the main component of the ceramic composition, in conjunction with a chemical doping agent which enters the lattice and produces semiconductivity. In practicing the invention, there can be used a starting mixture comprising about 89–99.3, and preferably 93.7–98.5, % by weight of strontium titanate having a Sr:Ti ratio of 1, to which is added a minor amount of an ingredient which unbalances the ratio such that either the A or the B component is in slight excess. There is also added to the mixture a minor amount of an appropriate chemical doping agent, depending on whether the A or the B component is in excess, which on firing enters the lattice structure and produces semiconductivity therein.

For unbalancing the ratio of the A and B components so that the B (Ti) component is in excess, there can be added to the strontium titanate a minor amount, within the range of about 0.1–5%, and preferably about 1.0–3.0%, by weight based on the total composition, of an oxide of a tetravalent metal selected from titanium, zirconium, germanium, silicon or tin. Examples of suitable oxides are $TiO_2$, $ZrO_2$, $GeO_2$, $SiO_2$, and $SnO_2$, of which $TiO_2$ is preferred.

When the stoichiometry of the strontium titanate is adjusted in this manner to achieve an excess of the B (Ti) component, the chemical doping agent used to produce semiconductivity is an oxide of a trivalent metal selected from bismuth, boron, iron, antimony, lanthanum and the rare earth and transition metals, in an amount of about 0.1–5%, and preferably about 0.7–3%, by weight of the total composition. Examples of suitable oxides are $Bi_2O_3$, $B_2O_3$, $Fe_2O_3$, $Sb_2O_3$, and $La_2O_3$, the preferred material being bismuth oxide ($Bi_2O_3$).

In accordance with the invention, the stoichiometry of strontium titanate can also be unbalanced to achieve an excess of the A (Sr) component in the perovskite lattice by incorporating in the strontium titanate about 0.5–5%, and preferably about 1.0–3%, by weight of an oxide of a divalent metal selected from strontium, calcium, barium and lead, e.g., SrO, CaO, BaO and PbO, the preferred oxide being SrO. In this case, the doping agent used to produce semiconductivity is about 0.5-5%, and preferably about 0.7-3.0%, by weight of an oxide of a pentavalent or hexavalent metal selected from tungsten (+6), niobium (+5), tantalum (+5), and molybdenum (+6). Examples of suitable oxides include $WO_3$, $Nb_2O_5$, $Ta_2O_5$, and $MoO_3$, a preferred material being $WO_3$.

The final ingredient in the mixture used to form the ceramic compositions of the invention is a material (counterdopant) selected from cuprous oxide ($Cu_2O$) and silver oxide ($Ag_2O$) which diffuses and preferentially segregates in the lattice during firing and produces boundary layer insulation. The counterdopant is used in an amount of about 0.1-1.0%, and preferably about 0.15-0.3%, by weight based on the total composition. Cuprous oxide is a preferred counterdopant.

In accordance with the method of the invention, a mixture of strontium titanate containing a material to produce an excess of either A (Sr) or B (Ti) components in the perovskite lattice, together with the appropriate semiconductor forming material (dopant) and the counterdopant is pressed and fired at a temperature of about 1200°-1400° C. for about 10-300 and preferably about 10-100 minutes, in air or in a neutral, e.g., nitrogen, or reducing atmosphere, e.g., 10% $H_2$, 90% $N_2$. During the firing, densification, semiconductor formation and boundary layer insulation occur simultaneously to produce a polycrystalline ceramic composition suitable for use as the dielectric material in capacitors. Since the process does not appreciably increase the grain size of the strontium titanate which constitutes the major component, it is possible, by using appropriately finely divided strontium titanate as a starting material, to produce ceramic compositions having a grain size less than about 10 microns, and typically 2-5 microns, which are highly suitable for use as dielectrics in thin-layer, multi-layer capacitors.

The mixture to be fired in accordance with the invention can be produced by mixing the required materials per se, e.g., preformed $SrTiO_3$ to which is added $TiO_2$ or SrO and an appropriate dopant and counterdopant. Alternatively, the starting mixture can be formed of materials which react at the firing temperature to produce the desired mixture. For example, strontium titanate can be formed from a mixture of SrO and $TiO_2$, or $SrCO_3$ and $TiO_2$, in the appropriate proportions to produce strontium titanate which is rich in Sr or Ti as desired. The other materials in the mixture can also be produced in this manner. For example, $WO_3$ can be used as such, or alternatively there can be used a precursor thereof, such as the acid $H_2WO_4$ and salts thereof which yield $WO_3$ on calcination.

The invention is illustrated by the following examples.

EXAMPLE 1

A mixture comprising 97.8% by weight of $SrTiO_3$, 1.0% of $TiO_2$, 1% of $Bi_2O_3$ and 0.2% of $Cu_2O$ was mixed in a ball mill until the strontium titanate had an average particle size of about 1-2 microns. The mixture was then pressure molded into discs having a diameter of 1.2 cm and a thickness of 0.1 cm. The discs were fired in air for 10 minutes at 1300° C. Electrodes were formed on the fired discs by applying a silver paste and baking at 850° C. in air for 30 minutes. The electrical properties of capacitors prepared in accordance with this example were as follows:

| | |
|---|---|
| Dielectric Constant ($\overline{K'}$) and 0.5 volts AC | 8,000-12,000 |
| Dissipation Factor (tan δ) | 0.01-0.02 |
| Voltage Coefficient of Capacitance (VCC at 200 volts DC) | <4% |
| Temperature Coefficient of Capacitance (TCC, −55 to 125° C.) | <15% |

EXAMPLE 2

Ceramic discs were prepared using the procedure and materials of Example 1, except that the firing was carried out for 50 minutes at 1350° C. in a neutral atmosphere of nitrogen. These ceramic compositions had the following electrical properties:

| | |
|---|---|
| Dielectric Constant ($\overline{K'}$) | 20,000-40,000 |
| Dissipation Factor (tan δ) | 0.01-0.02 |
| Voltage Coefficient of Capacitance (VCC at 200 volts DC) | <5.5% |
| Temperature Coefficient of Capacitance (TCC, −55 to 125° C.) | <10% |

EXAMPLE 3

Ceramic discs were prepared employing the procedure of Example 1 and using a mixture containing 97.05% by weight of strontium titanate, 1.25% of $TiO_2$, 1.5% of $Bi_2O_3$ and 0.2% of $Cu_2O$. The discs were fired at 1,300° C. for 50 minutes in an atmosphere of 10% hydrogen and 90% nitrogen. The ceramic compositions had the following electrical properties:

| | |
|---|---|
| Dielectric Constant ($\overline{K'}$) | 40,000-60,000 |
| Dissipation Factor (tan δ) | 0.01-0.02 |
| Voltage Coefficient of Capacitance (VCC at 200 volts DC) | <6% |
| Temperature Coefficient of Capacitance (TCC, −55 to 125° C.) | <6% |

All of the ceramic compositions described in the above Examples had grain sizes not larger than about 10 microns. Similar results can be achieved with other combinations of materials and processing conditions disclosed herein.

The foregoing detailed description has been given for clearness of understanding only and no unnecessary limitations should be understood therefrom as modifications will be obvious to those skilled in the art.

What is claimed is:

1. A method for producing a fine-grain semiconducting internal boundary layer ceramic composition comprising the steps of:
   A. forming a mixture comprising:
      (a) about 89-99.3% by weight of finely divided strontium titanate;
      (b) a combination of metal oxides selected from
         (1) about 0.1-5% of an oxide of a tetravalent metal selected from the group consisting of Ti, Zr, Ge, Si and Sn, and about 0.5-5.0% of an oxide of a trivalent metal selected from the group consisting of Bi, B, Fe, Sb, La and the rare earth and transition metals; and
         (2) about 0.1-5% of an oxide of a divalent metal selected from the group consisting of Sr, Ca, Ba and Pb and about 0.5%–5% of an oxide of a pentavalent or hexavalent metal selected from the group consisting of $W^{+6}$, $Nb^{+5}$, $Ta^{+5}$ and $Mo^{+6}$, and (c) about 0.1–1.0% of an oxide of a univalent metal selected from the group consisting of Cu and Ag; and B. pressing and firing the mixture of step A at a temperature of about 1200°–1400° C. for about 10–300 minutes.

2. The method of claim 1, wherein said mixture comprises about 97–98.5% by weight of strontium titanate, about 1.0–3.0% of said tetravalent metal oxide, about 0.7–3.0% of said trivalent metal oxide, and about 0.15–0.3% of said univalent metal oxide.

3. The method of claim 1, wherein said mixture comprises about 93.7–98.15% by weight of strontium titanate, about 1.0–3.0% of said divalent metal oxide, about 0.7–3.0% of said pentavalent or hexavalent metal oxide, and about 0.15–0.3% of said univalent metal oxide.

4. The method of claim 1 wherein said tetravalent metal is titanium, said trivalent metal is bismuth, and said univalent metal is copper.

5. A fine-grain semiconducting ceramic composition produced in accordance with the method of claim 1.

6. A fine-grain semiconducting ceramic coposition produced in accordance with the method of claim 2.

7. A fine-grain semiconducting ceramic composition produced in accordance with the method of claim 3.

8. A fine grain semiconducting composition produced in accordance with claim 4.

9. A fine-grain semiconducting boundary layer ceramic composition comprising about 89–99.3% by weight of polycrystalline strontium titanate having a grain size less than about 10 microns, about 0.1–5% of an oxide of a tetravalent metal selected from the group consisting of Ti, Zr, Ge, Si and Sn, about 0.5–5.0% of an oxide of a trivalent metal selected from the group consisting of Bi, B, Fe, Sb, La and the rare earth and transition metals, and about 0.1–1.0% of an oxide of a univalent metal selected from the group consisting of Cu and Ag.

10. A composition in accordance with claim 9 comprising about 93.7–98.15% of strontium titanate, about 1.0–3.0% of said tetravalent metal oxide, about 0.7–3.0% of said trivalent metal oxide, and about 0.15–0.3% of said univalent metal oxide.

11. A composition in accordance with claim 10 wherein said tetravalent metal is titanium, said trivalent metal is bismuth, and said univalent metal is copper.

12. A composition in accordance with claim 11 comprising about 97.8% by weight of strontium titanate, about 1.0% of $TiO_2$, about 1% of $Bi_2O_3$ and about 0.2% of $Cu_2O$.

13. A fine-grain semiconducting boundary layer ceramic composition comprising about 89–99.3% by weight of polycrystalline strontium titanate having a grain size less than about 10 microns, about 0.1–5% of an oxide of a divalent metal selected from the group consisting of Sr, Ca, Ba and Pb, about 0.5–5.0% of an oxide of a pentavalent or hexavalent metal selected from the group consisting of $W^{+6}$, $Nb^{+5}$, $Ta^{+5}$, and $Mo^{+6}$, and about 0.1–1.0% of an oxide of a univalent metal selected from the group consisting of Cu and Ag.

14. A composition in accordance with claim 13 containing about 93.7–98.15% of strontium titanate, about 1.0–3.0% of said divalent metal oxide, about 0.7–3.0% of said pentavalent or hexavalent metal oxide, and about 0.15–0.3% of said univalent metal oxide.

15. A composition in accordance with claim 14 wherein said tetravalent metal is titanium, said divalent metal is strontium, said hexavalent metal is tungsten, and said univalent metal is copper.

* * * * *